(12) United States Patent
McDougall et al.

(10) Patent No.: US 11,316,830 B2
(45) Date of Patent: Apr. 26, 2022

(54) DIGITAL CONTENT SECURITY AND COMMUNICATION SYSTEM USING ANONYMIZED ACCOUNT CLASSIFICATION AND ANALYSIS

(71) Applicant: ACCENTURE GLOBAL SOLUTIONS LIMITED, Dublin (IE)

(72) Inventors: Anthony McDougall, Lake George (AU); Kenton Dalkeith Jurgs, Burradoo (AU); Chia Jung Chang, Pyrmont (AU)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 313 days.

(21) Appl. No.: 16/426,855

(22) Filed: May 30, 2019

(65) Prior Publication Data

US 2019/0372940 A1 Dec. 5, 2019

Related U.S. Application Data

(60) Provisional application No. 62/678,119, filed on May 30, 2018.

(51) Int. Cl.
*H04L 29/06* (2006.01)
*G06Q 10/06* (2012.01)
*G06F 21/62* (2013.01)

(52) U.S. Cl.
CPC ...... *H04L 63/0421* (2013.01); *G06F 21/6254* (2013.01); *G06Q 10/067* (2013.01)

(58) Field of Classification Search
CPC .............. H04L 63/0421; G06Q 10/067; G06F 21/6254; G06F 2221/2115; G06F 2221/2117; G06F 21/10; G06F 21/577
See application file for complete search history.

(56) References Cited

U.S. PATENT DOCUMENTS 9,785,988 B2 * 10/2017 Petri .................. G06Q 30/0609
10,452,897 B1 * 10/2019 Benkreira .............. G06K 9/344
(Continued)

FOREIGN PATENT DOCUMENTS

WO WO-2018013431 A2 * 1/2018 ............ H04W 12/02

OTHER PUBLICATIONS

Gruteser et al., "Anonymous usage of location-based services through spatial and temporal cloaking", San Francisco, CA, USA May 5-8, 2003.*

*Primary Examiner* — Morshed Mehedi
(74) *Attorney, Agent, or Firm* — Mannava & Kang, P.C.

(57) ABSTRACT

A digital content security and communication system is disclosed. The digital content security and communication system may include one or more data stores to manage data within a network, and one or more servers to facilitate operations using information from the one or more data stores. The digital content security and communication system may include an analytics subsystem, the analytics subsystem system comprising a data access interface to receive data associated with a user interacting with an online application, and receive data from a data source. The analytics system may include a processor to: generate an anonymized account for the user based on the data associated with the user interacting with the online application; determine a risk parameter associated with the user; associate the anonymized account with the risk parameter; provide an application commencement option to the user when the risk parameter reaches a predetermined threshold; initiate an online application upon receiving a user response to initiate the application commencement option; and perform additional features and provide new services via a digital application conversation.

20 Claims, 13 Drawing Sheets

(56) References Cited

U.S. PATENT DOCUMENTS

| | | | |
|---|---|---|---|
| 10,943,311 B1* | 3/2021 | Svenson | G06Q 50/12 |
| 2012/0143706 A1* | 6/2012 | Crake | G06Q 20/206 |
| | | | 705/18 |
| 2013/0144785 A1* | 6/2013 | Karpenko | G06Q 20/425 |
| | | | 705/44 |
| 2016/0057619 A1* | 2/2016 | Lopez | G06F 9/455 |
| | | | 380/247 |
| 2016/0125424 A1* | 5/2016 | Zolli | G06Q 20/4016 |
| | | | 705/30 |
| 2016/0140545 A1* | 5/2016 | Flurscheim | G06Q 20/3829 |
| | | | 705/76 |
| 2017/0026343 A1* | 1/2017 | Wardman | H04L 63/06 |

* cited by examiner

| Discovery / Anonymous | Legal Agreement | Request for Who | Simultaneous Sharing / Consent / Authentication | Next Best Action / Eligibility, Risk and Marketing Treatment Plan(s) |
|---|---|---|---|---|
| • User can anonymously interact with the website without providing any details of themselves.<br>• This will create a anonymous account to track interactions with the GDP<br>• We can use this to start continuous risk and seamlessly transition to identified person.<br>• At which point the Risk can translate to a Threat. | • Apply Now Button is a singular start point for a Digital Application<br>• Legal point of agreeing terms of the application, legislation etc.<br>• Should exist in one location. | • Seamless connection to request who is applying<br>• Is an alternate option for agent/third party data entry to press Apply Now<br>• In this instance Next Best Action will hold until the individual applicant has enrolled | • Independent identity capture of the individual.<br>• Minimum is a liveliness check with facial images.<br>• Preference is passport documents supplied<br>• However, to support ID2020 this is optional but will have a different Next Best Action flow.<br>• Where practical face matched with documents and checked against a third party<br>• Applicant Consent to share | • At this stage the process is in full control of next step<br>• Depending on Risk and marketing could have complex Entity risk maps and treatment plans prepared.<br>• Can respond immediately through conversation or pause<br>• Pause can be any time from minutes to weeks depending on level of risk.<br>• This allows complex treatment plan to be developed<br>• Digital Rich Conversation.<br>• Applicant can withdraw at any stage |

DIGITAL CONTENT SECURITY AND COMMUNICATION SYSTEM USING ANONYMIZED ACCOUNT CLASSIFICATION AND ANALYSIS

PRIORITY

The present application claims priority to U.S. Provisional Patent Application Ser. No. 62/678,119, filed on May 30, 2018, the disclosure of which is incorporated by reference in its entirety.

TECHNICAL FIELD

This patent application relates generally to digital content security, and more specifically, to systems and methods for digital content security and communication using anonymized account classification and analysis.

BACKGROUND

Cyberattacks and data fraud are becoming a more serious threat to individuals, organizations, and overall society. The number of attacks are also increasing at a rapid rate. Several conventional approaches have been used to combat data security problems. Disk encryption in hardware and software, such as on-the-fly encryption (OTFE) or transparent encryption, involves converting data to an unreadable or otherwise inaccessible format. Data masking or data obfuscation is used to "hide" data. Masking is achieved by inserting random characters in data fields to mislead and prevent sensitive data from being accessed by unauthorized personnel. Backups are used for recovery of data to help restore data in the event of data corruption or erasure. These and other conventional techniques are used to help minimize the impact of cyberattacks and data breaches.

Organizational entities that rely on communication of data, especially in global digital transactions for goods or services, typically use some form of online portal in which a user may be required to submit an application containing information about his or her identity. Such technologies involve situations where a user inquires about or desires access to various commercial, financial, or government products or services.

Although these organizational entities are spending large amounts of money and resources to create and deploy online applications for more secured transactions, there are still several technical problems that continue to persist. For instance, it is a challenge to balance fraud prevention with customer experience. Relying on static identity data alone remains largely ineffective since digital content may be easily stolen, spoofed, or misused by fraudsters. Furthermore, customer behavior is complex, not always direct or predictable. For example, a single user can log in from multiple devices, locations, and channels. Also, creating an account before a customer can peruse or search various goods or services may hinder that customer from continuing. These and other behaviors can add extra layers of complexity to user authentication or identification that dampen any online application experience. As a result, a risk-based approach using digital identity intelligence may be needed to help organizational entities verify low-risk users with minimum friction to enhance digital content security and communication and yet still provide users a more pleasant online experience.

Accordingly, a more robust and holistic approach for digital content security and communication using anonymized account classification and analysis may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements, in which:

FIG. 4A illustrates a data flow for digital content security and communication, according to an example;

DETAILED DESCRIPTION

Figure 1:
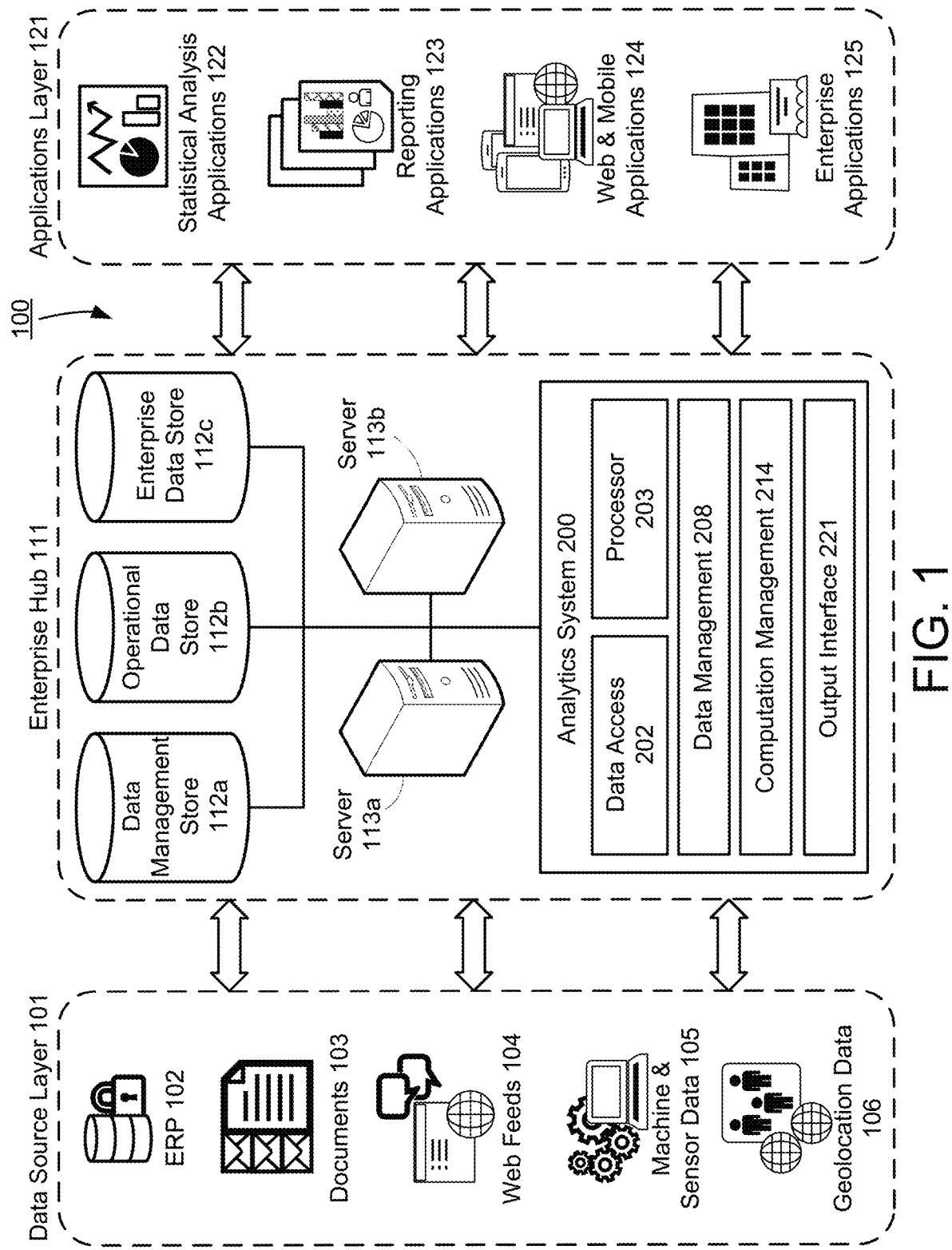
FIG. 1 illustrates an architecture for a digital content security and communication system, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, cyberattacks and data breaches are becoming a more serious threat. The number of attacks are also increasing at a rapid rate. Several conventional approaches have been used to combat data security fraud. However, organizational entities that rely on communication of data, especially in global digital transactions for goods or services, typically use some form of online portal in which a user may be required to submit an application containing information about his or her identity. Although such technologies involve creation and deployment of online applications for more secured transactions, several technical problems continue to persist. For instance, it is a challenge to balance fraud prevention with customer experience. Relying on static identity data alone remains largely ineffective since digital content may be easily stolen, spoofed, or misused by fraudsters. Furthermore, customer behavior is complex, not always direct or predictable. This can add extra layers of complexity to user authentication or identification that may hamper any positive online application experience.

According to examples described herein, a risk-based approach using digital identity intelligence may be provided to verify low-risk users with minimum friction to enhance digital content security and communication. As used herein, "friction" may be defined as a level of effort applied to a user to complete a task. As described herein, to complete an online application, for example, customer behavior typically indicates that it is cumbersome to gather personal details. Such processes often hinder customers from interacting and reduce user experience in online application process. Furthermore, a more robust and holistic approach for digital content security and communication using anonymized account classification and analysis may be provided to overcome the shortcoming of conventional systems and methods.

As described herein, a digital content security and communication system using anonymized account classification and analysis may be provided. In an example, the digital content security and communication system may reduce complexity of online application forms. For instance, online application forms are typically solely based on user identification or registration. Without creating an account and supplying user identification, a potential customer would not be able to peruse or search for various goods or services via any given application. The digital content security and communication system, as described herein, may change that, by using online data capture, for example, in conjunction with a single Apply Now feature (for submission of data). In other words, the digital content security and communication system may utilize a singular flow that integrates marketing, risk, legal agreement, identity proofing, and consent. In fact, this integration may be provided in such a way that the online application becomes a digital application conversation (DAC) between an individual (with very strong identity proofing) and an application service. In this way, a user may apply for services anonymously and then have their identity verified at a later time, while maintaining all legal requirements involved with using the application.

In an example, an anonymous account may be created for various users and linked via an anonymised global security graph to support anonymous user browsing and discovery. This may include remembering user or browsing history for the same device, across multiple devices for the user without storing any personally identifying information. This may allow for building, for instance, a risk and marketing view through behavioural and global security graphs.

It should be appreciated that the digital content security and communication system may also treat users differently based on an assigned risk score or parameter. For example, the application may employ various techniques to keep a user engaged with the application if the risk score is high. Keeping the user engaged with the application may allow intelligence officers or other administrators gather and assess more information about the user while he or she is still engaged with the application. This allows a more customized approach to user-verification based on complexity of customer behavior in real-time or near real-time.

Once a user desires to proceed (or when it is determined that the user is low-risk), a single Apply Now feature (e.g., an Apply Now button) may be provided to the user to initiate the online application and start the process. It may serve as an agreement on behalf of a user that he or she is starting an online application. Any data included may then be part of the online application process in accordance with any legal boundaries of the application. In an example implementation, the application may be defined as a digital application with a digital application conversation (DAC) forming the content of the application.

Upon selecting the Apply Now feature, a seamless creation of an identity through a third party (e.g., Australia Post Digital ID, YOTI®, or other digital identify vendor) may be provided, anchoring this session to a real world identity of the user. Additionally or alternatively, the user or applicant may select an existing digital identity. Not only does a single Apply Now feature streamline user interaction with an application, it may also facilitate efficient communication by combining multiple inputs into a single packet before sending these inputs to downstream processing applications. The digital content security and communication system may also include various user interfaces to facilitate user interactions with the application.

At this point, applicable risk, marketing, and legal agreements and/or the identity of the user may be utilized. Internal risk models based on real world identities may be integrated through the identity proof. This may be followed by a seamless process flow through a digital application conversation (DAC), based on rules that iterate payment, eligibility, marketing and/or risk treatment plans (conversation fragments) that may include a mix of techniques to gather information (e.g., forms, chatbots, submitting device data (geolocation), uploading photos, etc.).

Once one or more of the eligibility, risk and marketing plans are concluded, conditions and terms of offered services may be displayed and decision to grant or refuse may be provided to notify the user or applicant.

It should be appreciated that at any point, the digital application conversation may be paused and/or resumed to allow for intelligence or other processes to start/complete. The systems and methods described herein may also support ability to schedule human intervention to ask questions and to gather intelligence from a potentially nefarious applicant.

Each submission of a fragment of information may be used to build on the online application rather than waiting for a submission at the end. For example, each fragment may be configured so that it may not be undone. That said, a user or applicant may provide a different answer that may or may not overwrite a previous history.

It should also be appreciated that the user or application, at each point along the application process, may be consenting to the use of the information and at any time can choose to withdraw the application (however the last submission of information will be retained in accordance with the upfront agreement).

The digital content security and communication system described herein may therefore allow an organization entity (e.g., commercial, financial, government, etc.) to engage with users in a various ways based on a risk score or parameter associated with the user. The digital content security and communication system may also provide customized user interfaces and a single button feature to make user interactions with the online applications more expedient, less error prone, and more intelligent.

FIG. 1 illustrates a digital content security and communication system 100, according to an example. The digital content security and communication system 100 may be used to monitor and analyze data. In particular, the digital content security and communication system 100 may be used monitor and analyze data in an enterprise environment for an organizational entity. The organizational entity may be a financial entity, a commercial entity, a government entity, or other entity. The digital content security and communication system 100 may also store information or be able to receive information from other sources associated with personal data or information, some of which may be sensitive data or information. For example, the digital content security and communication system 100 may use anonymized account classification and analysis to help protect sensitive data and improve user experience. The digital content security and communication system 100 may further include a clustering system to provide risk analysis of sensitive data associated with users or customers interacting with online applications.

The digital content security and communication system 100 may operate in a network or an enterprise environment where data is exchanged, and where products or services are being offered to customers. More specifically, the digital content security and communication system 100 may provide real-time or near real-time monitoring and analysis of data exchange and data storage, as well as an artificial intelligence system that uses analytics and predictive modeling. The enterprise environment of the digital content security and communication system 100 may include a data source layer 101, an enterprise hub 111, and an applications layer 121. The data source layer 101 may include systems, subsystems, applications, and/or interfaces to collect information from enterprise resource planning (ERP) systems and applications 102 (hereinafter "ERP"), documents 103, web feeds 104, machine and sensor data 105 (hereinafter "sensor data"), and geolocation data 106, all of which may be distinct from or integrated with the digital content security and communication system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, ticketing, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other outside parties. As a result, the ERP 102 may contain large quantities of information and data associated with a company and its employees.

The documents 103 may provide another source of data. Data received at the documents 103 may include files, emails, faxes, scans, or other documents that are transmitted, received, and stored in an enterprise environment.

The web feeds 104 may be yet another source of data. Data received at the web feeds 104 may include data from various web sources, such as websites, social media, syndication sources, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data 105 may be another source of data and information in an enterprise environment. For example, in an enterprise network, there may be physical devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data 105 may provide significant amounts of information and data that can be collected. Together with other technologies and systems described herein, the machine and sensor data 105 may help enable the digital content security and communication system 100 provide a more efficient way to balance user experience with online application security.

The geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data 106 may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data 106 may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the data source layer 101 may be collected, monitored, analyzed, and/or incorporated with user verification and authentication for digital content security and communication.

The enterprise hub 111 may collect, manage, process, and analyze information and data from the data source layer 101 and the applications layer 121. The enterprise hub 111 may be within general control of an enterprise, such as an organizational entity conducting operations, business, or other related activities. The enterprise hub 111 may collect, manage, process, and analyze information and data from the data source layer 101 and the applications layer 121. In order to do this, the enterprise hub 111 may include one or more data stores, one or more servers, and other elements to process data for its organizational purposes. For example, the enterprise hub 111 may include a data management store 112a, an operational data store 112b, and an enterprise data store 112c. The data management store 112a may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112b may store information and data associated with operational reporting, controls, and decision-making. The operational data store 112b may be designed to integrate data from multiple sources for additional operations on that data, for example, in reporting, controls, and operational decision support. Integration of data at the operational data store 112b may involve cleaning, resolving redundancy, checking against business rules, and other data integration techniques, such as data virtualization, federation, and extract, transform, and load (ETL). The operational data store 112b may also be a source of data for an enterprise data store 112c, which may be used for tactical and strategic decision support.

The enterprise data store 112c may store information and data associated with reporting and data analysis, and may be instrumental to various business intelligence functions. For example, the enterprise data store 112c may be one or more repositories of integrated data (e.g., from the operational data store 112b) and used to store current and historical data and to create analytical report(s) for advanced enterprise knowledge. Data passed through the enterprise data store 112c may also involve cleansing to ensure data quality and usage. ETL may also be used, as well as other techniques, involving staging, data integration, and access features. Ultimately, data in the enterprise data store 112c may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113a and 113b that facilitate, coordinate, and manage information and data. For example, the servers 113a and 113b, as well as others described herein, may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided. It should be appreciated that the data management 208 and computation management 214 may be other processing components integrated or distinct from processor 203 to help facilitate data processing by the analytics system 200 as described herein. Features and functionalities may be particularly helpful in data management, predictive analytics, and machine learning.

There may be many examples of hardware that may be used for any of the servers, layers, subsystems, and components of the analytics system 200 or the digital content security and communication system 100 described herein. For example, the processor 203 may be an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements via a network in the digital content security and communication system 100. More detail of the analytics system 200 is provided in FIG. 2.

The digital content security and communication system 100 may also include an applications layer 121. The applications layer 121 may include any number or combination of systems and applications that interface with users or user-interfacing tools in an enterprise or a personal environment. For example, the applications layer 121 may include statistical analysis applications 122, reporting applications 123, web and mobile applications 124, and enterprise applications 125.

The statistical analysis applications 122 may include systems or applications used in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the enterprise hub 111.

It should be appreciated that a layer as described herein may include a platform and at least one application. An application may include software comprised of machine-readable instructions stored on a non-transitory computer readable medium and executable by a processor. The systems, subsystems, and layers shown in FIG. 1, or another figure, may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the digital content security and communication system 100, as described herein. However, it should be appreciated that multiple servers may be used for each of these servers, and the servers may be connected via one or more networks. Also, middleware (not shown) may include in the digital content security and communication system 100 as well. The middleware may include software hosted by one or more servers, or it may include a gateway or other related element. Such middleware may be used to enhance data processing, edge-based analytics, or other related operations. Furthermore, it should be appreciated that some of the middleware or servers may or may not be needed to achieve functionality. Other types of servers, middleware, systems, platforms, and applications not shown may also be provided at the back-end to facilitate the features and functionalities of the digital content security and communication system 100.

The digital content security and communication system 100, as described herein, may provide several benefits and advantages over conventional techniques. For example, the digital content security and communication system 100 may balance user experience with an analytics-based online application. It may also streamline process flow and provide a system akin to a "truth" diode, where a user (customer or applicant) may be anchored to an application at an early stage without necessarily having created a personalized account but with some other secure identifier (e.g., facial recognition, biometric, or other identifier). This may allow for a digital application conversation (DAC) that is dynamic and evolves with persistent interaction by the user. All the while, the digital content security and communication system 100 may know the entire history of such a conversation such that any subsequent fraud may be tied back to the user.

The digital content security and communication system 100 may also be friction driven. In other words, friction may be defined by a level of effort applied to a user, e.g., an applicant, to complete an online application process. As stated above, customer behavior typically indicates that it is cumbersome to gather personal details. Such processes often hinder customers from interacting and reduce user experience. However, if friction is reduced, a customer has a better online application experience. The digital content security and communication system 100 may leverage the power of analytical business intelligence and other features to provide users with a plurality of variations of frictions to support multiple types of online application processes. For example, a frictionless experience (no more questions beyond intent and identity) may be provided to users or customers that have been determined to be low-risk. They may also be offered various marketing promotions or discounts based on their risk score, parameter, or marketing potential. In a medium friction scenario, the digital content security and communication system 100 may require limited levels of additional information, such as applicant's previous history, declaration type questions, etc. In a full friction scenario, the digital content security and communication system 100 may provide additional liveliness tests, acquire device location(s), request direct video chat(s), etc.

The digital content security and communication system 100 may be platform independent. In other words, online applications associated with the digital content security and communication system 100 may be used across various platforms, such as Windows, MAC, Unix, or other operating systems. The digital content security and communication system 100 may also be hosted in the cloud, provisioned/accessed via the web, or provided locally/remotely via on-site premises.

Within the digital content security and communication system 100, there may be a large amount of data that is exchanged, and the exchanged data may be sensitive or personal. Many of the conventional security systems for protecting sensitive data, as described above, are static and not dynamic. With new laws and regulations surrounding sensitive personal data possessed by organizational entities, a more robust approach to handle and process potentially sensitive personal data may be needed.

The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. The digital content security and communication system 100, as described herein, may also therefore provide a more dynamic and scientific approach to provide monitoring, diagnostics, and analytics to using and processing such potential sensitive data in an enterprise network.

Ultimately, the digital content security and communication system 100 may provide a risk-based approach using digital identity intelligence to help organizational entities verify low-risk users with minimum friction to enhance digital content security and communication and yet still provide users a more pleasant online experience. The digital content security and communication system 100 may provide a more robust and holistic approach for digital content security and communication using anonymized account classification and analysis.

Figure 2:
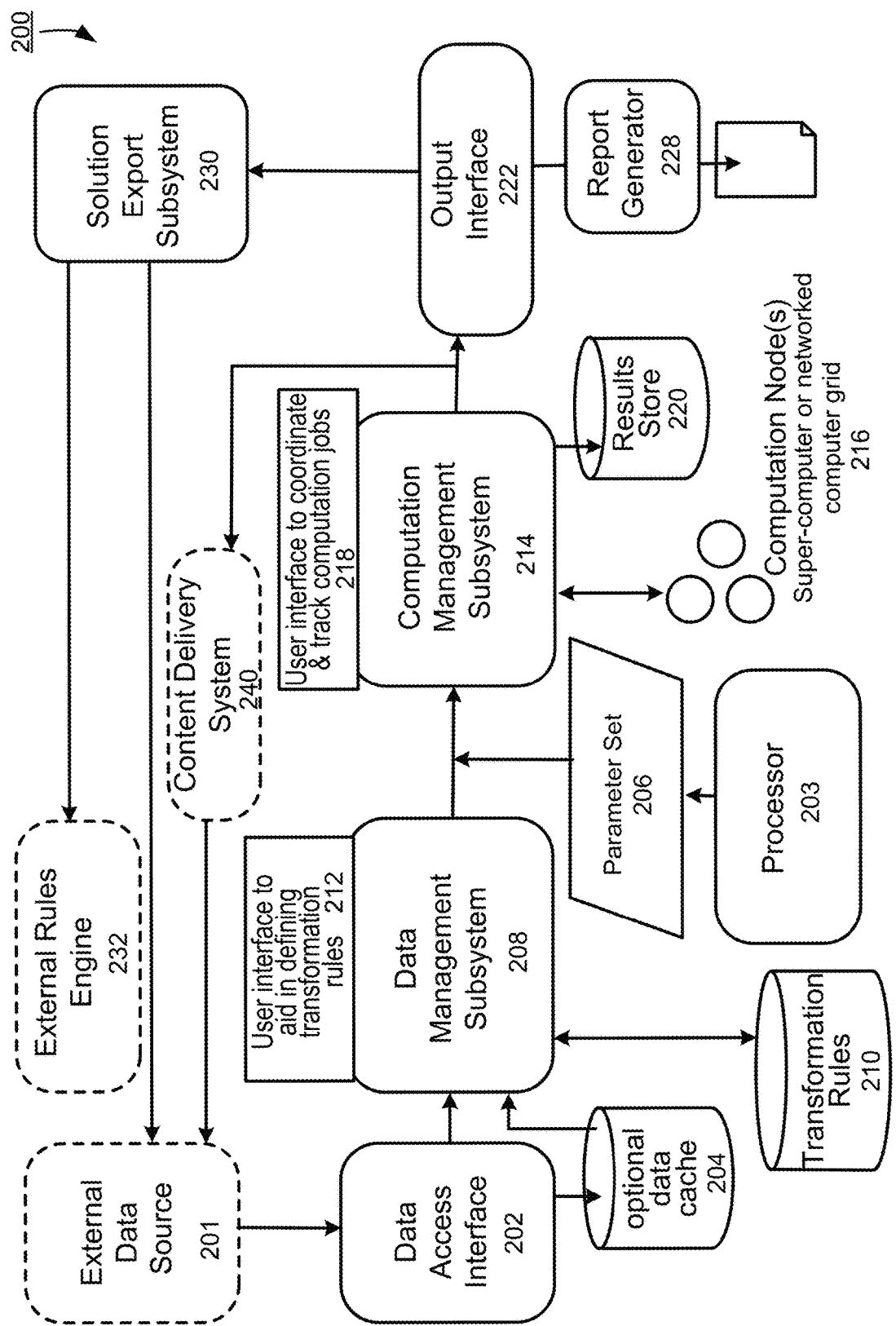
FIG. 2 illustrates an example of components in an analytics system, according to an example.

FIG. 2 illustrates an example of components in the analytics system 200, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may provide identification and protection of sensitive personal data using uniqueness factor classification and analysis. In an example, the analytics system 200 may be an integrated system as part of the enterprise hub 111 shown in FIG. 1.

In the example of FIG. 2, data may be accessed from an external data source 201 by a data access interface 202. The external data source 201 may be any data source from the data source layer 101, enterprise hub 111, and applications layer 121 of the digital content security and communication system 100 of FIG. 1, as well as other data sources not depicted. The data access interface 202 may optionally store some or all (or none) of the data in an optional data cache 204, which may be local or remote. The imported data may then be passed to a data management subsystem 208 for processing prior to performing analytics. For example, the data management subsystem 208 may organize the data by grouping, ordering, transforming, or cleaning the data in such a way that facilitates input of the data into analytics processing. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 to a user that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

In an example involving clustering, the analytics system 200 may separate variables in the data across three distinct types: Target Drivers, Cluster Candidates, and Profile Variables. Target Drivers may be factors that are for driving the success of a business, such as revenue, profitability, potential value of a customer, costs, etc. In some cases, there may be no more than two or three target drivers. Cluster Candidates may be attributes that are readily available that may be used to partition the overall customer population. These may describe the population and may be significantly different from the business drivers. Profile Variables may be other factors that are not assigned as cluster candidates or target drivers, such as customer behavior patterns/trends or other similar attributes. Profile variables may not be immediately actionable (the data may not be easily accessible or may be found only after a period of lime) or they may be too much of a restatement of the business drivers.

The variables determined by the data management subsystem 208 and a parameter set 206 generated by the processor 203 may be provided to the computation management subsystem 214. The computation management subsystem 214 may send the processed data including the parameter set 206 and one or more chosen clustering algorithms to one or more computational nodes 216 to perform clustering operations. The clustering operations may identify several (e.g., thousands or millions) different cluster solutions, each including a plurality of clusters of the data.

The computation management subsystem 214 may evaluate generated cluster solutions based on user-specified criteria, and iterate through multiple sets of cluster solutions to identify cluster solutions that satisfy the criteria. The computation management subsystem 214 may identify also apply one or more generalized heuristic supervised learning algorithms to the computation process to improve the efficiency of the solution search, based on the cluster solutions generated by the computational nodes 216. The supervised learning algorithms may utilize target driver variables specified by the user to facilitate searching for particular cluster solution(s), among the potentially many cluster solutions generated by the computation nodes 216, that are meaningful to the user. The computation management subsystem 214 may also provide a user interface 218 that shows the user the progress of the clustering and shows cluster solutions.

The computation management subsystem 214 may also provide a user interface 212 that shows the user the progress of the clustering and shows cluster solutions. The user interface may be an output interface 222, like that shown in FIG. 1, which may in turn include a visualization interface that may show cluster solution(s) and other information pertaining to the cluster solutions. A report generator 228 may generate report regarding the cluster solutions.

In some implementations, the visualization interface may also provide the cluster solution(s) and/or evaluation results to a solution export subsystem 230. The solution export subsystem 230 may provide feedback information to the analytics system 200 or other systems in the digital content security and communication system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding a cluster solution to different types of external databases and external systems, and facilitate the implementation of the cluster solution by the external systems. In some implementations, the solution export subsystem 230 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the analytics system 200 may enable more than just an analytics tool, but also enable a feedback-based and connected enterprise system.

The output interface 222 may include a visualization interface that provides the resulting cluster solution(s) and results of the evaluation to a report generator 228, which may generate a report to be output to the user, such as a security manager or other user. The report may include various types of information regarding the evaluation of the cluster solution(s) or other calculation, and may enable a user to adjust one or more variables of the analytics system 200 to fine-tune the clustering operations.

By providing a composite technique of cluster generation and cluster evaluation, the analytics system 200 may enable the user to analyze the details and nuances of many (e.g., dozens of) solutions at the same time, rather than individually analyzing one solution at a time to see if each solution is appropriate. The analytics system 200 may therefore enable a user to explore a large number (e.g., millions) of cluster solutions efficiently in less time than it would take a typical practitioner to evaluate fewer (e.g., a couple dozen) cluster solutions. It should be appreciated that while clustering is described, other various techniques may also be provided. These may include modeling, simulation, predictive analytics, use of knowledge graphs, as well as various other statistical or data-driven approaches.

In an example, the analytics system 200 may also include an external system, such as content delivery system 240, that may be controlled based on a selected cluster solution. For example, instructions may be sent to the content delivery system 240 based on attributes determined for clusters in the selected cluster solution. In an example, attributes may be identified for a cluster that are associated with customers shopping with coupons, which may indicate that a shopping pattern associated with coupons exists that is particular to shoppers from a particular geographic location, such as a north west region. The computation management subsystem 214 or another subsystem or layer not shown may send instructions to the content delivery system 240 to digitally send electronic coupons over a network to customers in the north west region. In an example, the content delivery system 240 may include a contact resource management system, such as provided by Salesforce.com®, Infusionsoft®, Microsoft Dynamics®, etc., which automatically targets customers. For example, data in a database that is associated with customers in the north region may be queried and for each customer customized emails or coupons are automatically sent. The content delivery system 240 may have the flexibility to send emails and coupons with a time-interval of hours, days, weeks, etc. and also has an option to trigger sending through the instructions. The external data source 201 may capture online behaviors of the targeted customers to determine whether the coupons are being used for purchases and to provide feedback for future clustering.

In some implementations, the user interfaces 212, 218, including the output interface 222, may be custom-designed user interfaces that facilitate some portion of the overall activity and, in some cases, may be used by multiple users with different roles. As such, the analytics system 200 may coordinate and facilitate a distributed process of cluster generation and evaluation, and streamline the tasks and roles that potentially involve the participation of multiple people.

The analytics system 200 may monitor and analyze data exchanged in an enterprise network to streamline an online application process, all the while minimizing risk to an organization entity, reducing potential fraudulent or risky activities associated with sensitive data, and enhancing ease of use for users.

Figure 3:
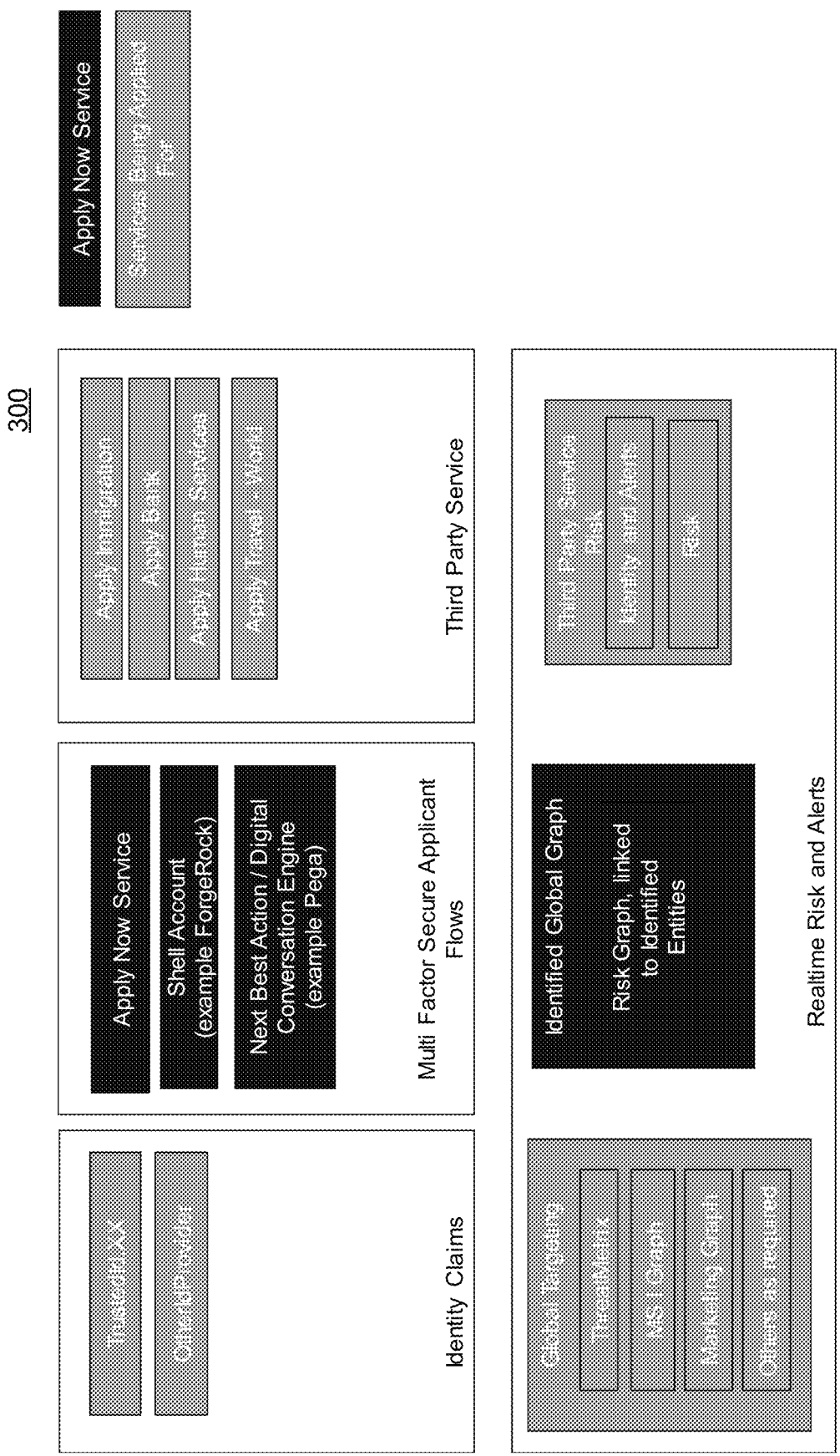
FIG. 3 illustrates a block diagram for a digital content security and communication, according to an example.

FIG. 3 illustrates a block diagram 300 for a digital content security and communication, according to an example. As shown, the block diagram may provide an exemplary core architecture for digital content security and communication. The block diagram 300 may include identity claims, multi-factor secure applicant flows, third party service, real-time or near real-time risk and alerts. The identity claims may include Trusted.XX and OtherIdProvider, or other identity claim. The multi-factor secure applicant flows may include an Apply Now Service, Shell Account (e.g., ForgeRock), Next Best Action/Digital Conversation Engine (e.g., Pega), or other application flow or operation. The third party service may include Apply Immigration, Apply Bank, Apply Human Services, Apply Travel-World, or other third party service. The real-time or near real-time risk and alerts may include global targeting, identified global graph, third party service risk, or other risk and alerts. The global targeting may include various elements, such as ThreatMetrix™, MS I Graph, Marketing Graph, etc. Identified global graphs may include risk graph, e.g., linked to identified entities. Third party service risk may include Identity and Alerts, Risk, or other elements. Other variations or options may also be provided.

FIG. 4A illustrates a data flow 400A for digital content security and communication, according to an example. As shown, the data flow 400A may include various parts, phases, or stages, such as Discovery/Anonymous, Legal Agreement, Request for Who, Simultaneous Sharing/Consent/Authentication, and Next Best Action/Eligibility, Risk and Marketing Treatment Plan(s). Each of these will be described in more detail below.

Figure 4B:
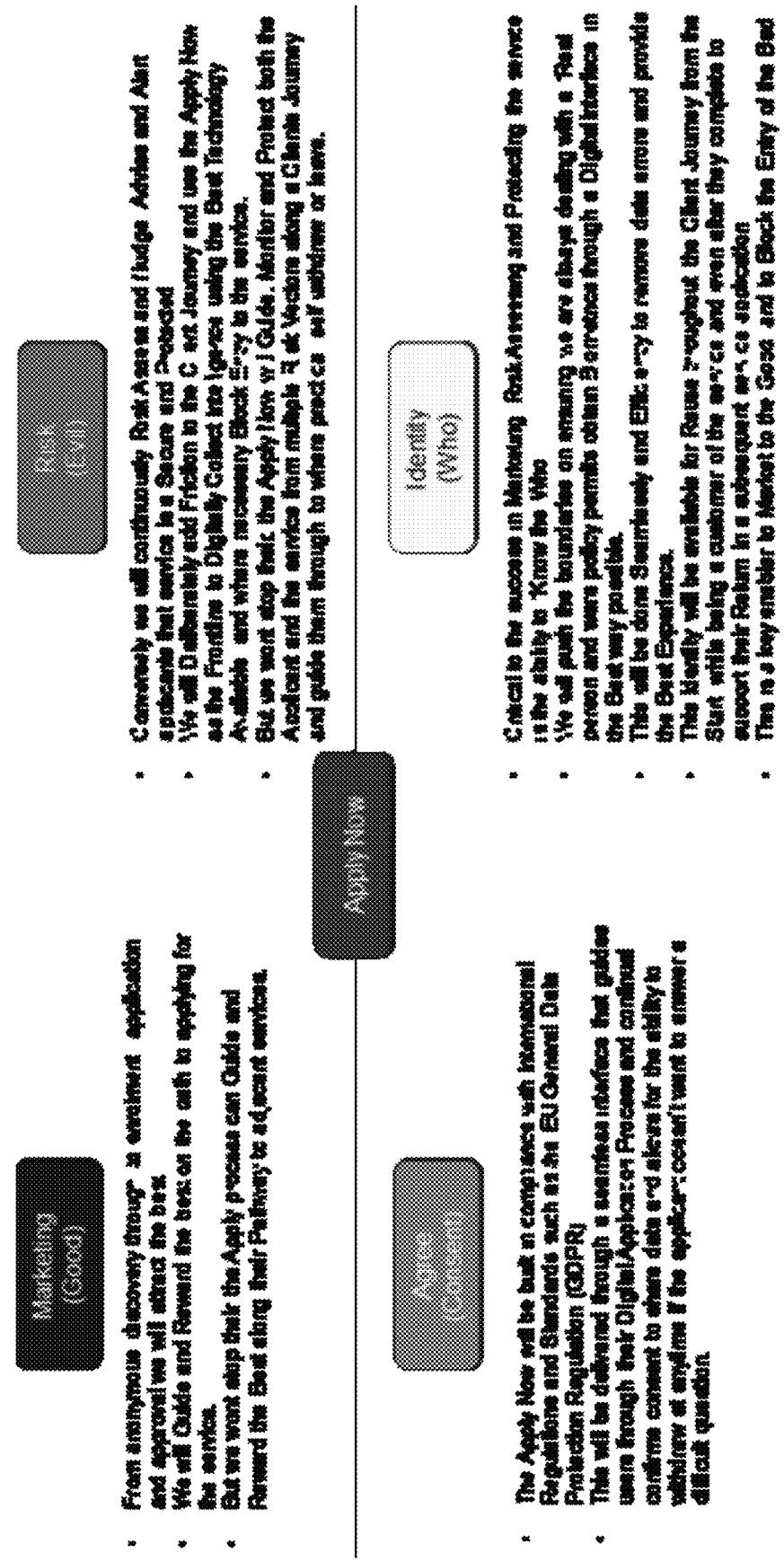
FIG. 4B illustrates a schematic diagram of how the digital content security and communication system combines key elements, according to an example.

FIG. 4B illustrates a schematic diagram 400B of how the digital content security and communication system combines key elements, according to an example. As shown, it may be seen how marketing, risk, legal agreement, and identity may be combined in the digital content security and communication system 100. For marketing, there are several advantages. From anonymous discovery through to enrollment, application, and approval, an organization entity may be able to attract the most desirable customers.

From a risk perspective, an organizational entity may use computing equipment to continuously assess risk of various users and provide risk functionalities, such as Risk Assess and Nudge, Advise and Alert applicants that service is a Secure and Protected. It may also allow friction to be added to a user/applicant journey and use the Apply Now as sort of a "frontline" to digitally collect intelligence using a variety of techniques. And where necessary, an organization entity may block entry to the service if a user has a high risk score or parameter.

Furthermore, the Apply Now feature may also guide, monitor and protect both applicant and provider alike from various risk vectors along a user/applicant journey and guide him or her through the process using practical guidance (e.g., continue, withdrawn, abandon, etc.).

As far as complying with one or more legal agreements, the Apply Now feature may be designed and built to comply with International Regulations and Standards such as the EU General Data Protection Regulation (GDPR). Organizational entities may be able to deliver online applications through a seamless interface that guides users through their digital application process and continually confirm consent to share data and allows for the ability to withdraw at any time if a user or applicant does not want to answer a difficult or sensitive question.

For identity, it may be critical to success in marketing, risk assessment and protecting the service to have a feature, such as the ability to "Know the Who." For example, the digital content security and communication system may push the boundaries on ensuring an organization entity is dealing with a "real" person and where policy permits, to obtain biometrics through a digital interface or other measure.

Again, this may be achieved seamlessly and efficiently to remove data errors and provide enhanced user experience.

It should be appreciated that this identity may also be available for reuse throughout a client journey from start to finish. This may include while being a customer of the service and even after he or she completes to support their return in a subsequent service application.

Referring back to FIG. 4A, the data flow 400A may include various parts, phases, or stages, such as Discovery/Anonymous, Legal Agreement, Request for Who, Simultaneous Sharing/Consent/Authentication, and Next Best Action/Eligibility, Risk and Marketing Treatment Plan(s). Each of these will be described in more detail below. FIGS. 5A-5E illustrate screens for digital content security and communication, according to an example, and may provide details for each of these phases or stages.

Figure 5A:
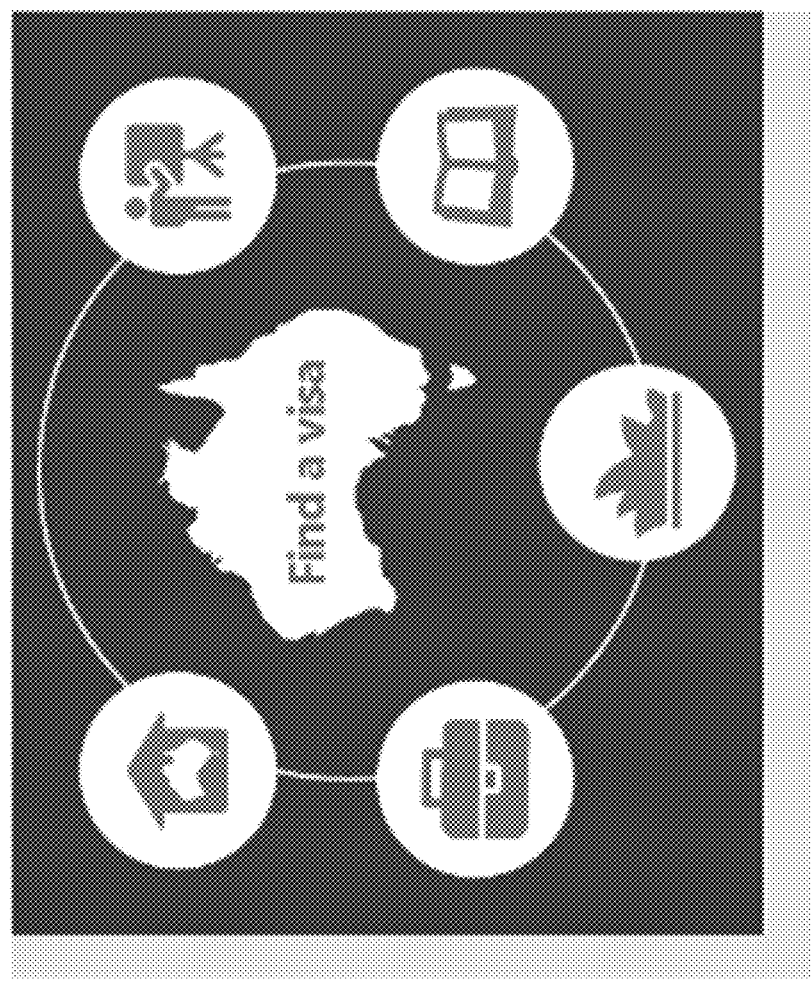
FIGS. 5A-5E illustrate screens for digital content security and communication, according to an example.

FIG. 5A illustrates a screen 500A for discovery using an anonymized account in a digital content security and communication system, according to an example. Here, a user may anonymously interact with the website without providing any details of themselves. An anonymous account may be allowed to be created to track interactions with the GDP. This may be where a continuous risk assessment may be started before seamlessly transitioning to an identified person.

For example, an anonymous graph with external risk and integrated within internal knowledge may alerts and graph. Other features may include behavioral risk build, marketing planning and promoting, visa wizard type options to test out expectations, etc. Other applications and functionalities may be used to create anonymous accounts and track behavior before creating an account. For instance, it may be shown that a user may have a high risk graph area that requires pre-enrollment treatment planning.

At this point, independently captured identity may be fused with global marketing and risk engine scores (that have collected anonymised risk scores only so far) and the information required to identify who wants the service may be combined.

In sum, this phase may be a key enabler to market to potentially good customers, and to block entry of the potentially bad customers. Data acquired here may be used to help guide and/or reward potentially good customers on a path to applying for access for various goods or services being offered by the organizational entity. Moreover, in this phase, digital content security and communication system 100 may also guide and/or provide other adjacent goods or services as well.

Figure 5B:
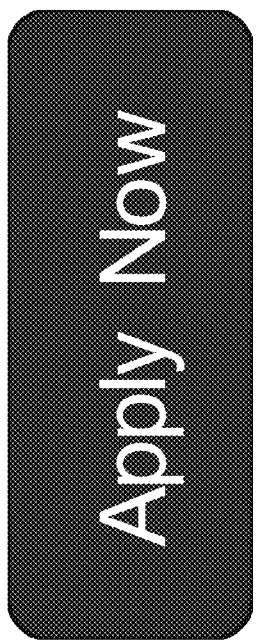

FIG. 5B illustrates a screen 500B for a legal agreement using an Apply Now feature in a digital content security and communication system, according to an example. For a user, pushing the Apply Now button may be how one legally starts an online application. In other words, the Apply Now Button may be a singular start point for a digital online application, e.g., legal point of agreeing terms of the application, legislation. etc. Here, an application may no longer be a static set of forms but rather a digital set of UI fragments. It should be appreciated that the application may need to clearly inform a user that this is the start of a legal application, and each fragment of data may be processed and stored individually. Once sufficient information is received, a decision to grant/refuse may be notified.

It should be appreciated that an applicant may withdraw at any time. This agreement and intent may be held in the current session, but at this stage the user may still remain anonymous. Any associated global anonymised risk and marketing engines may start, plus any other cybersecurity related checking of the device. At this point, the request may be made to get who has clicked the button. It may be critical this is after the agreement.

Also that at the time of agreement original agreement the user may be anonymous. This may be critical in the design so the moment in time of applying for a service is at the same moment in time they provide us consent for sharing their personally identifying information.

It should be appreciated that an encrypted token may be passed and or session used to tie the identity together with a third party provider of a Digital Identity. Again, the Apply Button may be added anywhere or activated through any device (UI or voice).

The value may be that a user can only interact with the service if they are willing to consent to sharing their digital identity and comply with the legal laws of the application process at the same time. There may be no other way for a user to interact and game the system without first having a strong identifier through the digital identity. The result may be a fusing of the individual consent to share personally identifying information, anonymised marketing scores, anonymised risk scores and intent of the service and legal agreement into a single user action flow.

This may have benefits in the processing of applications as it allows for marketing, risk and the rights of the individual to be protected at the same time and allows for the context of an application gathering information to become a continuous stream of digital data (Digital Application Conversation) that has been consented to by the applicant.

This stream of information may include a rich array of content including questions, attachments, consent to open API's, direct chat with human/bots, device actions (send geolocation), etc. However, the applicant must remain in control and consenting at every step.

The applicant may still be in control of engaging and continuing the Digital Application Conversation. If at any point in time the wish to disengage, the application can be withdrawn and/or the applicant can block/remove access notifications to be sent from the Apply Now service.

Applicant control along the flow after consenting to Apply Now may be important trust and to remain compliable. The key is that at the point this is provided, it may passed as a singular packet to the Apply Now service end-point. At this point, the Apply Now service end-point may be in complete control of the next user action, at the exact same time when the user is first known to the Apply Now service. Core to the design is that all information may be provided at the same without any user interaction (singular packet). If for any reason the legal agreement, identity, global risk scores and marketing scoring is not provided in a complete packet, the application service may fail to respond.

At this point, the service may start and fuse evaluation of marketing, risk and identity at the same time and can respond in which ever way is best for the third party service provider knowing that a complete version of the Individual is known and the intent of the individual to access the service (for which they are applying). It is worth noting the apply may be for multiple different services from multiple providers all related to the same intent.

The response may be real-time, near real-time, or other option (e.g., a hold or freeze), especially if additional time may be required to conduct assessment. The subsequent service response may be asynchronously provided directed at the individuals device through a notification model. It is at this point that further information may be gathered and it is at the discretion of the Apply Now service.

It should be appreciated that a direct connection may be effectively established between the Apply Now service and the individual including potentially their biometric and any other information (based on the policy and intent of the end service). This may include aspects such as: Face, Name, documents, geo-location, etc., all of which was consented to by the end user. The Apply Now feature may also provide this information to a third party to validate the risk of the individual and approve associated services required based on the intent.

In addition, the Apply Now feature may also provide subsets of this information to service providers to assess potential services that may be suitable based on the intent of the Apply Now Button. This may depend on the terms and agreements as specified prior to and agreed to by the individual when they pressed the button.

Each call may provide a synchronous response (back to the Apply Now) service which will correlate and determine how to communicate to the end user's device, or respond at a later time through an alternate notification model (send email correspondence, etc.). It should be appreciated that an organizational entity, via the digital content security and communication system 100 may also push a task, nudge or provide supporting information directly to the device to protect individuals.

Also as discussed above, there may be customizable levels of friction options. For example, these may include, but are not limited to:

- Ask user to do a liveliness test so we know they are a real person, and still the same one that started at the apply stage;
- Request information that can be pushed as tasks (individual or as a job lot) based on the risk vector of concern as to which it is used;
- Request the individual contact a call centre or start video conference with a service provider (or a third party);
- Direct text chat discussion with service provider or a third party;
- Request Finger print/IRIS scan etc. at a physical location; and
- Request Consent for Geo-Location (This would need to be a restricted function).

For high risk cases (e.g., to the applicant in relation to human services or the border in relation to travel) a task can be sent to an officer at any point during the clients next best action sequences. This may be in parallel to enable observation and intervention. This may also be to multiple concurrent officers at the same time. A screen may be required to support Entity/Application view including picture, information, risk graphs, related entities etc., streaming of responses as received through the DAC, etc.

Because the device can be notified to send a task, an officer may intervene with an intelligence based conversation through questions and answers after the initial application data entry either by amending treatment plans or taking control of the next action. Alternative implementations may employ artificial intelligence (AI) driven applications to interact with clients using text-based or synthesized voice-based conversations.

For direct device access, it should be appreciated that notification mechanism to digital identity application could support enabling additional security and intelligence gathering features. Each request may need individual user consent (request for geo-location). This may require the digital identity application to have features to provide this information.

Figure 5C:
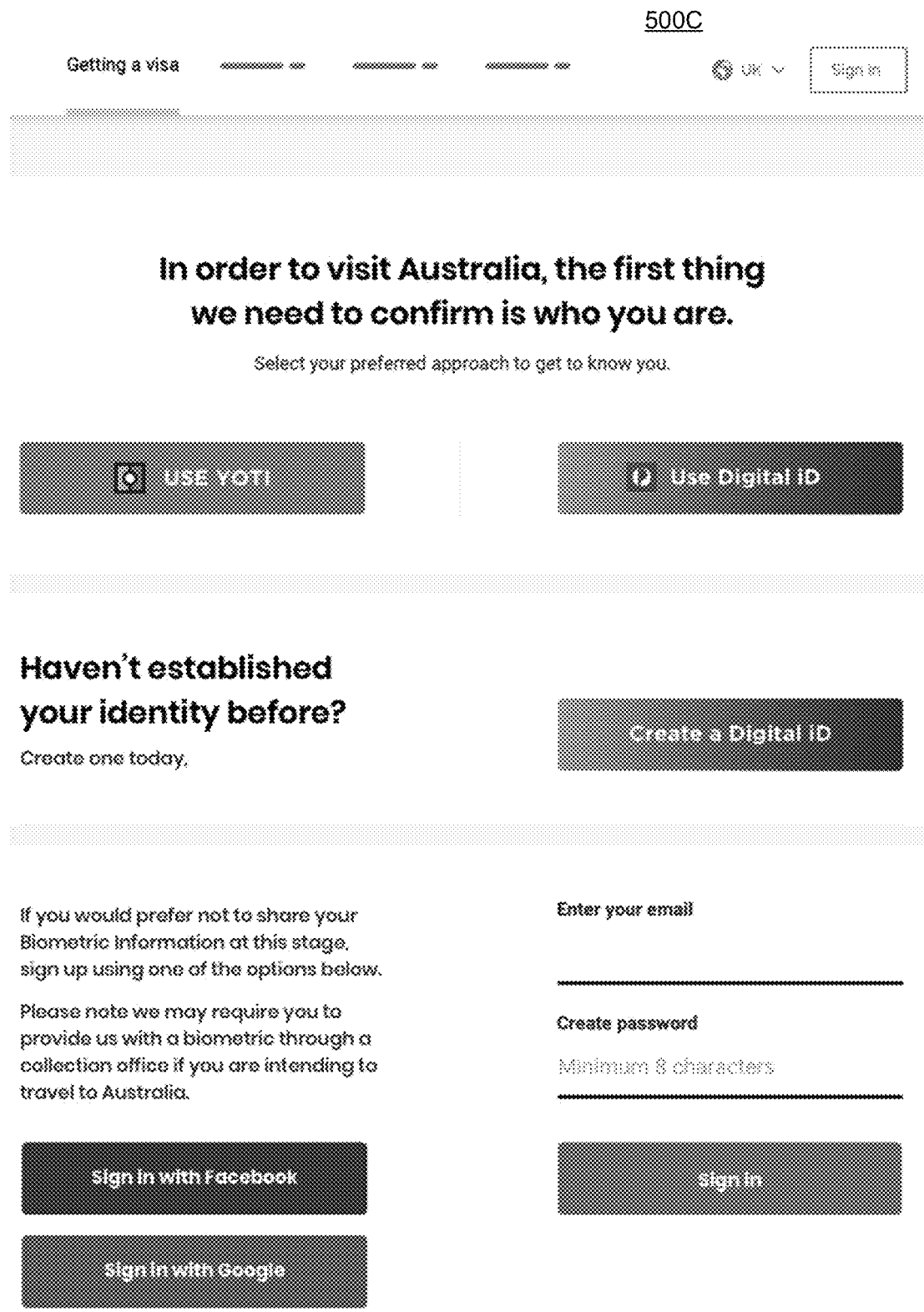

FIG. 5C illustrates a screen 500C for account request confirmation in a digital content security and communication system, according to an example. As shown, a seamless connection may be provided to request who is applying. It may also be determined if there is an alternate option for agent/third party data entry to press Apply Now. In this instance, Next Best Action may hold until the individual applicant has enrolled In other words, this step may include independently obtaining the individuals personally identifying information. This may be done through any third party with a requirement that it sends all of the information back to the session in a single packet. However, the access control to the independent party may be separate (and may be seen to be separate from a trust perspective) from the Apply Now Service. This is because the client can choose to become unknown from the third party and also the Apply Now service independently. Also that the packet from the provider includes the required consent for Service X to use the associated Information.

Figure 5D:

FIG. 5D illustrates a screen 500D for biometric data consent in a digital content security and communication system, according to an example. As shown, this may include independently capturing an identity of the individual. At a minimum, this may include a liveliness check with facial images, or other similar option. In some examples, there may be a preference for using identification associated with passport documentation, and in situations with dual (or multiple) nationals, the biometric data consent in a digital content security and communication system may support ID2020 as an option. And where practical, a facial image that is matched with such passport documentation may also be checked against other third party sources.

Again, this phase involves applicant consent to share. Enrollment flow may go through external identity provider. Once consent for identity data is received, the individual may be linked to the anonymous account. Risk Alerts and final graph check may be completed with known identity. Treatment Plan developed for remaining question and answer sets (both auto and manual for higher risk levels). In this instance, the re-use may still be after the client has consented to share the data.

Specifically, even if the user has pushed the Apply Now button on the same device. The session doesn't have access to the personally identifying information until after the user has consented to share the data.

Figure 5E:
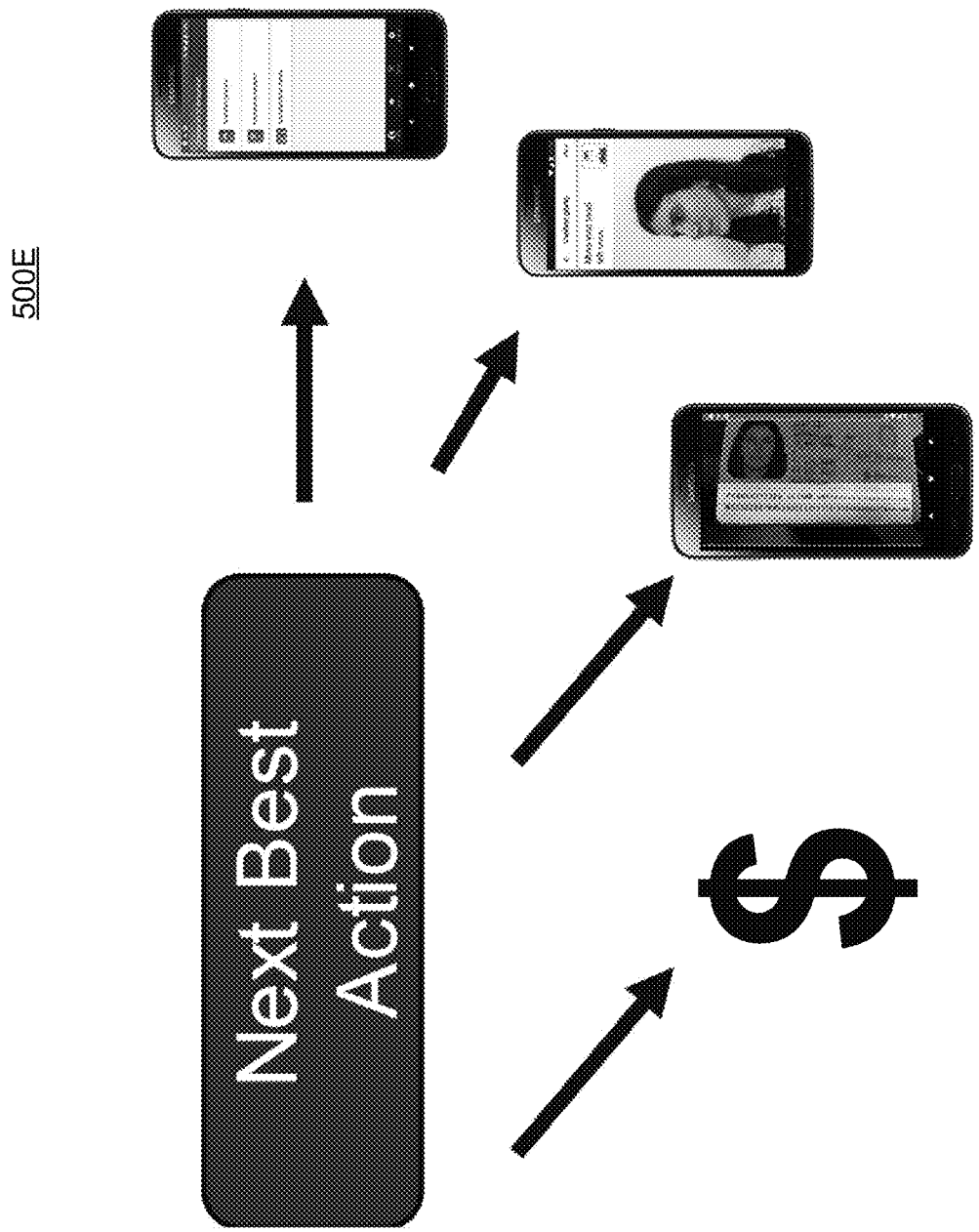

FIG. 5E illustrates a screen 500E for Next Best Action and/or data treatment plans in a digital content security and communication system, according to an example. At this stage, the process may be in control of next step. Depending on Risk and marketing, this may involve complex Entity risk maps and treatment plans prepared. An organizational entity may respond immediately through a conversation or a pause. In an example, a pause may be any time from minutes to weeks depending on level of risk.

During a conversation or a pause, it should be appreciated that time may for afforded for a complex treatment plan to be developed. It may also allow for digitally rich conversations to gain more information from a user, which may be helpful in verification. While an applicant may withdraw at any stage of the conversation or pause, it should be noted that dynamic questions and answers may be provided based on risk level of the user at that time. As described herein, if the user has demonstrated higher risk, there may be more time for conversation or pause. If the user has demonstrated lesser risk, there may be less need for a lengthy conversation or pause. Rules may be set or developed with various fragment flows, and these rules may also include a mix of digital options. These may include, but not limited to: Q&A (as per current), AI Bot Chat, Request Geo Location, Liveness Test, Direct chat with Intel, Video/phone location based intelligence gathering, Phone import of contacts, etc. Whatever may be asked for may need consent and an option to withdraw at any time may be provided. Again, these features may be provided to meet various legal and consent requirements.

The advantages of the digital content security and communication system may be apparent, and may include the Apply Now feature, integrated risk graphs, customized friction service levels, and orchestration. With regard to the Apply Now feature, a single button and associated logic that sits within the context of any application for service may be provided by the digital content security and communication system. It may take an anonymous user and intent (e.g., gathered anonymously) and obtain explicit acceptance of consent via a click of the Apply button, for data collection and use and the commencement of a Digital Application (Conversation).

With regard to integrated risk graphs, it should be appreciated that the digital content security and communication system may include features in the page which prior to clicking the Button, may create an anonymous account based on Global Risk Graphs to track the user actions and build an anonymous graph (we don't know the user yet they are just a number). Through the global risk graph, the digital content security and communication system may identify who else the person knows via doing a level 2 query on the graph. Once again, these may be anonymised numbers so may not be actionable. The system may use existing alert lists and by having all interactions with the service enrol using a hard identity, internally the service can map from an anonymized ID to a real person. This mapping may build over time and depending on the service may have a population of known previous applicants to anonymize. The result of this may be that the complete risk of the individual is unknown (beyond the online risk provided by the source security graph), but the system may know the risk (and real world identities) of the people the anonymized identity is related to. Based on this improved risk graph technical service, the system may support significant risk analysis prior to the user disclosing their true identity.

For Appropriate Friction Service, a service component that is based on the Integrated Risk Graph and the explicit acceptance may be provided, as well as other inputs, determines the best way to apply friction to the application based on the desire to offer the applicant service (e.g., make it less appealing or more appealing to a customer) or to apply further checks based on the risks that the applicant presents (e.g., include additional checks, request payment early in the process). The application questions can be paused and restarted based on the friction determined action. This allows for manual intelligence gathering and other aspects to be conducted as such allows the application service to have complete control of the order and timing of questions. This control is extended beyond the life of the application and allows for intelligence gathering to occur at later stages as well. By way of definition Friction is the level of effort applied to the applicant to complete the process. The business flow allows for infinite variation in friction from anywhere of seamless (nothing required) through to frictionfull with the potential for infinite friction.

For Digital Application Conversation (Next Best Action), it should be appreciated that the Apply Now service may be in complete control of the Application through a Digital Conversation which includes technical innovation in creating the steps, integrating the mixture of human and AI based questions and responses and the ability to change from an application form capture data to a fluid and dynamic Digital Conversation. The Apply Now service may control questions, sequence, timing and volume of questions (in addition to running question to multiple applicants concurrently for joint applications to check for anomalies, etc.). Each iteration will build on and evaluate marketing, risk and eligibility. The applicant may be in control of sharing their information during the Digital Conversation. At each step they may be asked to consent to the information being shared, and be given the option to withdraw their application (noting that previous responses will be retained by the Service Provider).

The system may provide computer-implemented orchestration to integrate these technical innovations into a business process specifically for the application for any service. The process flow may be a singular flow that results in something like a "truth" diode, where the applicant has very early anchored the application with a personal identifier (in this iteration their live face) and we can then have a dynamically changing Digital Application Conversation. All the while knowing the complete history of the conversation such that any subsequent fraud can be tied back to the individual that started the conversation.

Figure 6:
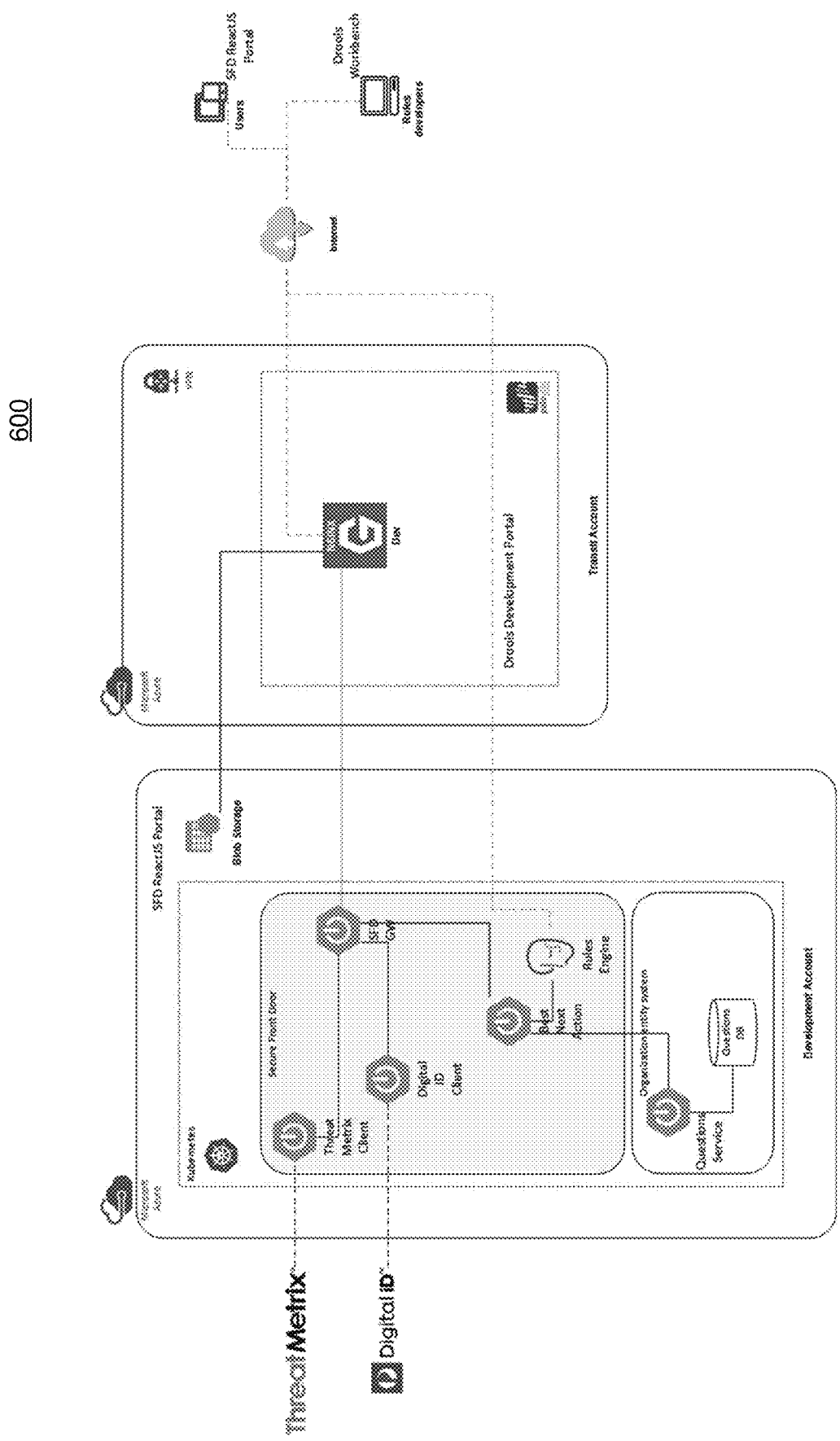
FIG. 6 illustrates a block diagram of a secure front door subsystem of the digital content security and communication system, according to an example.

It should be appreciated that in some examples, a secure front door subsystem may be provided. FIG. 6 illustrates a block diagram 600 of a secure front door subsystem of the digital content security and communication system, according to an example. A secure front door subsystem may combine digital identity with digital footprint (e.g., global security graph), which may provide high level of confidence regarding the person you are dealing with and their associated risk indicators. For example, a digital footprint (and relationships between entities within it) may be used as a risk indicator, as well having the option to also merge this with internal risk indicators, alerts and internal graphs, all as a part of the digital content security and communication system described in FIG. 1. The result is the ability to target risk from the beginning of the process, have an identity that is not able to be disguised as it is backed by biometric features, and fuse this with internal risks. Ultimately, the secure front door subsystem may provide an ability to build a stronger and higher confidence risk assessments into the digital content security and communication system.

Putting this at the start of a process allows for the process to be driven by the next best action for this individual allowing for a unique process. This solution may be applicable to processes that are strongly anchored by a person's identity including at least one of the following: policing, border control, security vetting, and banking. Other various scenarios may also benefit from these functions and features.

In an example implementation, there may be a plurality of areas of principal concern for the secure front door subsystem. Some exemplary areas are as follows:

Digital Identity—This may be a third party provided and re-usable digital identity, which may include a biometric identifier (or other secure identifier) and document identity collection and verification.

Global Security Graphs—Global security graphs that run and collect indictors of risk and relationships to third parties that may be independent of the platform being protected. This may allow risk indicators to be gathered from a much broader set and can include relationships between entities.

Integrated Risk and Identity—A integration feature may provide the ability to fuse an Identity, Global Security Graphs and internal risk models, for example, all in a single click (a point in time). This means when a person is identified (e.g., via face/biometric/liveness test), at the same time, rules for risks assessment may be validated.

Friction Variable Process—Depending on the risk model identified and selected, there may be varying levels of friction provided. In some examples, a seamless or very little information type process may be provided. In other examples, a high friction process that requests information and runs information and intelligence gathering steps may also be provided. Thus, according to the settings and models used, friction may be customizable for the intended purpose or need.

In some examples, the technical architecture of secure front doors subsystem may be built and demonstrated using the following components: Microsoft Azure®, Digital iD™, ThreatMetrix®, NGINX, Drools, and Kubernetes. It should be appreciated that while the technical architecture of secure front doors subsystem may be demonstrated using these components, other similar or various components may be substituted or used. As shown in FIG. 6, Microsoft Azure, or other cloud services provided, may provide underlying cloud infrastructure. In some examples, this may be built on reusable architecture with similar demonstration. Digital iD or other tool may provide re-usable biometric identity or other secure identifier feature. ThreatMetrix or other tool may provide the global security graphs. As shown, NGINX may be a reverse proxy to access the WEB portal and the REST API calls. Drools may provide or help facilitate actions determined by rules configured in the rule engine. Kubernetes or other system may be the rules engine deployed in the cluster. Again, other various systems or tools may be used in lieu of those described in FIG. 6. It should also be appreciated that results may be provided in a dynamic questions module for additional validation when the confidence score is low.

As shown in FIG. 6, the secure front door (SFD) portal may be provided via a cloud service (e.g., Azure), where the secure front door may be communicatively coupled to the organizational entity system. This rules engine may help facilitate communications of Best Next Action via the DAC or questions service at the organizational entity system. The SFD portal may also be communicatively coupled to a development portal (e.g., Drools) for transit account. This may be established via virtual private network (VPN) or other secure data protocol. These and other features and functions will be apparent in the detailed description provided herein.

Figure 7:
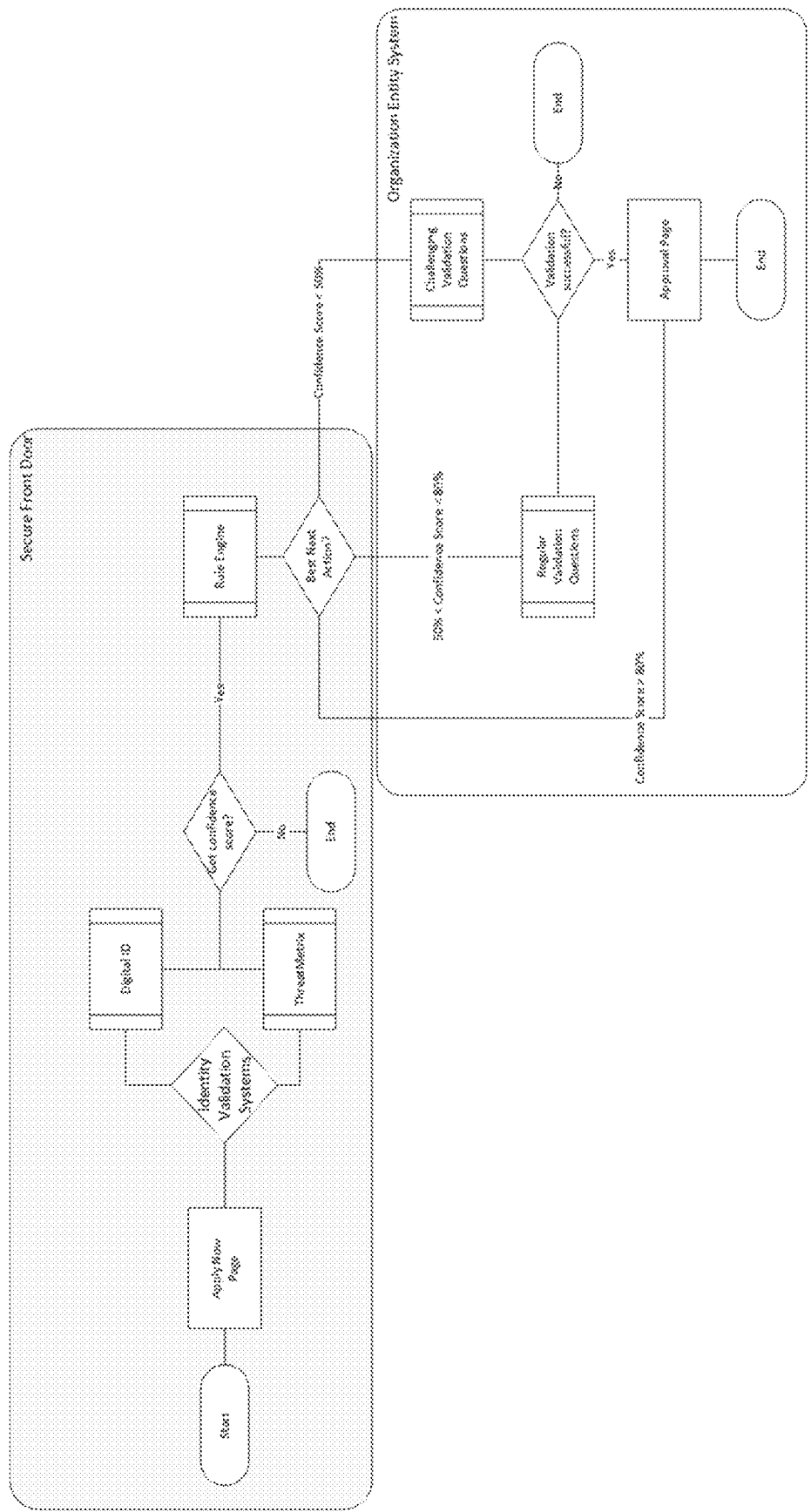
FIG. 7 illustrates a data flow for a secure front door subsystem with an organizational entity system, according to an example.

FIG. 7 illustrates a data flow 700 for a secure front door subsystem with an organizational entity system, according to an example. In particular, the data flow may illustrate implementation of a dynamic friction process for the secure front door subsystem described with respect to FIG. 6. In some examples, the secure front door subsystem may implement a re-usable identity and global security graph, and in a single click (Apply Now Page), to allow a user to go from knowing nothing to having a view of risk using the digital content security and communication system.

As shown, FIG. 7 may begin with an Apply Now Page that leads to an identity validation system (e.g., digital ID, ThreatMetrix, etc.). In the event validation is not met (confidence score threshold not met), the data flow 700 may end. Upon validation, or meeting a particular confidence score threshold, the rules engine may provide a Best Next Action. The secure front door subsystem may then communicatively couple with the organization entity system to provide additional validation. In some examples, if the confidence score is less than 50%, the DAC may provide additional challenging validation questions. In some examples, if the confidence score is higher, such as less than 80%, regular validation questions may be provided by the DAC. In some examples, if the confidence score is greater than 80%, validation may automatically be provided. In this way, a tiered or more dynamic approach to validation may be provided.

It should be appreciated that identity, as used herein, may be re-usable. In some examples, it may be anchored to documents and biometric (where required) history as well. It should be appreciated that an action (e.g., Best Next action) may be a point of variable friction. As described above, this may provide low or high levels of customizable friction levels, which may allow complex integrated risk and intelligence gathering depending on the specific scenario. Combining re-usable identity and risk may result mean that global history and digital footprint can be combined in a single click.

Figure 8:
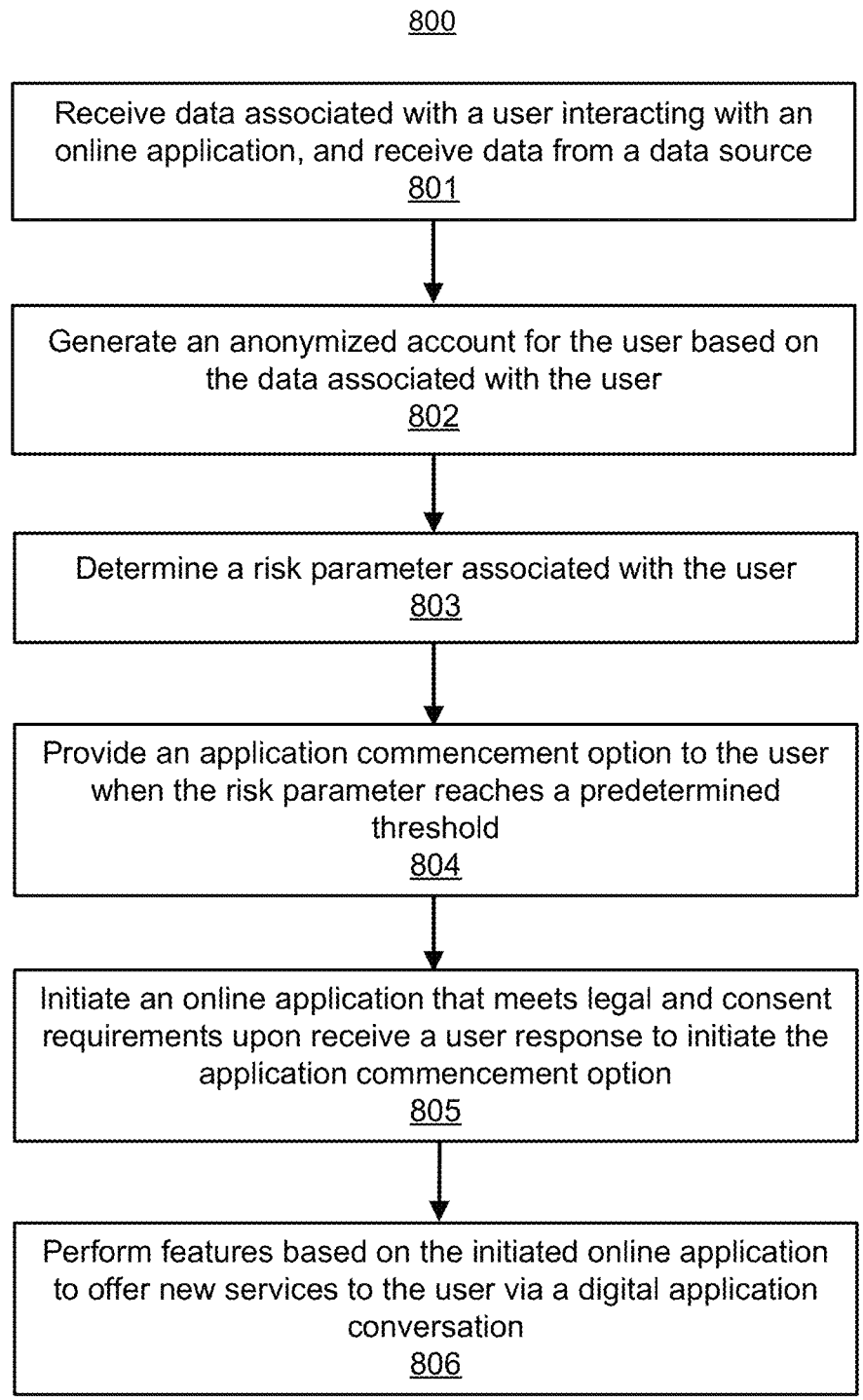
FIG. 8 illustrates a method for a digital content security and communication system, according to an example.

FIG. 8 illustrates a method 800 for a digital content security and communication system, according to an example. The method 800 is provided by way of example, as there may be a variety of ways to carry out the method described herein. Although the method 800 is primarily described as being performed by systems 100 and 200 as shown in FIGS. 1 and 2, respectively, and data according to data flow 400A of FIG. 4A, the method 800 may be executed or otherwise performed by other systems, or a combination of systems. Each block shown in FIG. 8 may further represent one or more processes, methods, or subroutines, and one or more of the blocks may include machine-readable instructions stored on a non-transitory computer readable medium and executed by a processor or other type of processing circuit to perform one or more operations described herein.

At block 801, the data access interface or processor may receive data associated with a user interacting with an online application. The data access interface or processor may also receive data from a data source. In some examples, the data source may include a website, a document, enterprise resource planning (ERP) system, a database, a web feed, a sensor, a geolocation data source, a server, an analytics tool, a mobile device, a reporting system, and/or other data source.

At block 802, the processor may generate an anonymized account for the user based on the data associated with the user interacting with the online application. At block 803, the processor may determine a risk parameter associated with the user and the interaction with the online application. In some examples, the risk parameter may be associated with a potential threat of the user. At block 804, the processor may associate the anonymized account with the risk parameter. At block 805, the processor may provide an application commencement option to the user when the risk parameter reaches a predetermined threshold.

At block 806, the processor may initiate an online application that meets legal and consent requirements upon receiving a user response to initiate the application commencement option. In some examples, initiating the online application may include converting the anonymized account to a secure user account. Converting the anonymized account to a secure user account may be based on additional information received from the user. In some examples, initiating the online application may include associating data previously associated with the anonymized account to the user account. Associating data previously associated with the anonymized account to the user account may also include associating the risk parameter to the user account.

At block 807, the processor may perform additional features based on the initiated only application and offering new services to the user. It should be appreciated that in some examples, the online application may include a digital application conversation (DAC) between the user and an application service. The DAC may help perform additional features and offer new services to the user. In some examples, the new services may include at least one future recommendation action for the user. It should also be appreciated that these additional features, the new services, and or future recommendation actions may be transmitted, via the processor or output interface, to the user at a user device.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A digital content security and communication system, comprising:
   one or more data stores to store and manage data within a network,
      the data associated with one or more of:
         a user,
         a transaction,
         an online application, or
         a system;
   one or more servers to facilitate operations using information from the one or more data stores;
   an analytics subsystem that communicates with the one or more servers and the one or more data stores in the network, the analytics subsystem comprising:
      a data access interface to receive data associated with the user interacting with the online application and receive data from a data source;
      a hardware processor to:
         generate an anonymized account for the user based on the data associated with the user interacting with the online application;
         determine a risk parameter associated with the user;
         associate the anonymized account with the risk parameter;
         provide an application commencement option to the user, wherein the application commencement option is provided to the user when the risk parameter reaches a predetermined threshold value and determines at least one of user identity, eligibility, application parameters, or continuous risk;
         initiate the online application that meets predetermined requirements upon receiving a user response to initiate the application commencement option, including determining a friction variation associated with the user of a plurality of friction variations and generating the online application based on the determined friction variation associated with the user; and
         perform features based on the online application to offer new services to the user; and
      an output interface,
         the output interface transmitting the features to offer new services to the user at a user device.

2. The digital content security and communication system of claim 1, wherein the data source comprises at least one of a website, a document, enterprise resource planning (ERP) system, a database, a web feed, a sensor, a geolocation data source, a server, an analytics tool, a mobile device, and a reporting system.

3. The digital content security and communication system of claim 1, wherein the risk parameter is associated with a potential threat of the user.

4. The digital content security and communication system of claim 1, wherein initiating the online application comprises:
   converting the anonymized account to a secure user account; and
   associating data previously associated with the anonymized account to the secure user account.

5. The digital content security and communication system of claim 4, wherein converting the anonymized account to the secure user account is based on additional information received from the user.

6. The digital content security and communication system of claim 4, wherein associating data previously associated with the anonymized account to the secure user account further comprises associating the risk parameter to the secure user account.

7. The digital content and communication system of claim 1, wherein the online application comprises a digital application conversation (DAC) between the user and an application service.

8. The digital content security and communication system of claim 1, wherein the new services comprise at least one future recommendation action for the user.

9. A method for digital content security and communication, comprising:
   receiving, at a processor, data associated with a user interacting with an online application;
   receiving data from a data source;
   generating an anonymized account for the user based on the data associated with the user;
   determining a risk parameter associated with the user and user interaction with the online application;
   associating the anonymized account with the risk parameter;
   providing an application commencement option to the user, wherein the application commencement option is provided to the user when the risk parameter reaches a predetermined threshold and determines at least one of user identity, eligibility, application parameters, or continuous risk;
   initiating an online application that meets legal and consent requirements upon receiving a user response to initiate the application commencement option, including determining a friction variation associated with the user of a plurality of friction variations and generating the online application based on the determined friction variation associated with the user;
   performing additional features based on the online application and offering new services to the user; and
   transmitting the additional features or the new services to the user at a user device.

10. The method of claim 9, wherein the risk parameter is associated with a potential threat of the user.

11. The method of claim 9, wherein initiating the online application comprises:
   converting the anonymized account to a secure user account; and
   associating data previously associated with the anonymized account to the secure user account.

12. The method of claim 11, wherein converting the anonymized account to a secure user account is based on additional information received from the user, and wherein associating data previously associated with the anonymized account to the secure user account further comprises associating the risk parameter to the secure user account.

13. The method of claim 9, wherein the online application comprises a digital application conversation (DAC) between the user and an application service.

14. The method of claim 9, wherein the new services comprises at least one future recommendation action for the user.

15. A non-transitory computer-readable storage medium having machine-executable instructions stored thereon, which when executed instructs a processor to perform the following:
   receiving, at the processor, data associated with a user interacting with an online application;
   receiving data from a data source;
   generating an anonymized account for the user based on the data associated with the user;
   determining a risk parameter associated with the user and the user interaction with the online application;
   associating the anonymized account with the risk parameter;
   providing an application commencement option to the user, wherein the application commencement option provided to the user when the risk parameter reaches a predetermined threshold and determines at least one of user identity, eligibility, application parameters, or continuous risk;
   initiating an online application that meets legal and consent requirements upon receiving a user response to initiate the application commencement option, including determining a friction variation associated with the user of a plurality of friction variations and generating the online application based on the determined friction variation associated with the user;
   performing additional features based on the online application and offering new services to the user, wherein the new services comprises at least one future recommendation action for the user; and
   transmitting the at least one future recommendation action for the user to the user at a user device.

16. The non-transitory computer-readable storage medium of claim 15, wherein the risk parameter is associated with a potential threat of the user.

17. The non-transitory computer-readable storage medium of claim 15, wherein initiating the online application comprises;
   converting the anonymized account to a secure user account; and
   associating data previously associated with the anonymized account to the secure user account.

18. The non-transitory computer-readable storage medium of claim 17, wherein converting the anonymized account to the secure user account is based on additional information received from the user.

19. The non-transitory computer-readable storage medium of claim 17, wherein associating data previously associated with the anonymized account to the secure user account further comprises associating the risk parameter to the secure user account.

20. The non-transitory computer-readable storage medium of claim 15, wherein the online application comprises a digital application conversation (DAC) between the user and an application service.

* * * * *

UNITED STATES PATENT AND TRADEMARK OFFICE
CERTIFICATE OF CORRECTION

| | |
|---|---|
| PATENT NO. | : 11,316,830 B2 |
| APPLICATION NO. | : 16/426855 |
| DATED | : April 26, 2022 |
| INVENTOR(S) | : Anthony McDougall et al. |

It is certified that error appears in the above-identified patent and that said Letters Patent is hereby corrected as shown below:

In the Claims

At Claim 7, Column 24, Line 31 from the top, the phrase "digital content" should instead read "digital content security"

At Claim 17, Column 26, Line 19 from the top, the phrase "comprises;" should instead read "comprises:"

Signed and Sealed this
Fourteenth Day of February, 2023

*Katherine Kelly Vidal*

Katherine Kelly Vidal
*Director of the United States Patent and Trademark Office*